US010627240B2

(12) United States Patent
Denaro

(10) Patent No.: US 10,627,240 B2
(45) Date of Patent: Apr. 21, 2020

(54) DATA MINING IN A DIGITAL MAP DATABASE TO IDENTIFY DECREASING RADIUS OF CURVATURE ALONG ROADS AND ENABLING PRECAUTIONARY ACTIONS IN A VEHICLE

(71) Applicant: HERE Global B.V., Eindhoven (NL)

(72) Inventor: Robert Denaro, Long Grove, IL (US)

(73) Assignee: HERE Global B.V., Eindhoven (NL)

( * ) Notice: Subject to any disclaimer, the term of this patent is extended or adjusted under 35 U.S.C. 154(b) by 0 days.

(21) Appl. No.: 15/996,656

(22) Filed: Jun. 4, 2018

(65) Prior Publication Data

US 2018/0283879 A1 Oct. 4, 2018

Related U.S. Application Data

(63) Continuation of application No. 14/196,640, filed on Mar. 4, 2014, now Pat. No. 10,012,510, which is a (Continued)

(51) Int. Cl.
*G08G 1/09* (2006.01)
*G01C 21/26* (2006.01)
(Continued)

(52) U.S. Cl.
CPC ........... *G01C 21/26* (2013.01); *B60W 40/072* (2013.01); *B60W 40/076* (2013.01); *G01C 21/3697* (2013.01); *G06F 16/29* (2019.01)

(58) Field of Classification Search
None
See application file for complete search history.

(56) References Cited

U.S. PATENT DOCUMENTS 4,775,865 A 10/1988 Smith et al.
5,270,708 A 12/1993 Kamishima
(Continued)

FOREIGN PATENT DOCUMENTS

DE 10030819 A1 1/2002
EP 1069547 A1 1/2001
EP 1104881 A1 6/2001

OTHER PUBLICATIONS

European Office Action cited in the corresponding European Application No. 09 251 231.8; dated Mar. 8, 2018; 6 pages.
(Continued)

*Primary Examiner* — Hung D Le
(74) *Attorney, Agent, or Firm* — Lempia Summerfield Katz LLC

(57) ABSTRACT

Disclosed is a feature for a vehicle that enables taking precautionary actions in response to conditions on the road network around or ahead of the vehicle, in particular, a curved portion of a road where the curvature increases between adjacent curved sections. A database that represents the road network is used to determine locations where curvature between adjacent curved sections increases. Then, precautionary action data is added to the database to indicate a location at which a precautionary action is to be taken about the location where curvature increases. A precautionary action system installed in a vehicle uses this database, or a database derived therefrom, in combination with a positioning system to determine when the vehicle is at a location that corresponds to the location of a precautionary action. When the vehicle is at such a location, a precautionary action is taken by a vehicle system as the vehicle is approaching a location where the curvature increases.

8 Claims, 5 Drawing Sheets

Related U.S. Application Data continuation of application No. 12/156,224, filed on May 30, 2008, now Pat. No. 8,698,649.

(51) Int. Cl.

| | |
|---|---|
| ***G06F 16/29*** | (2019.01) |
| ***B60W 40/072*** | (2012.01) |
| ***B60W 40/076*** | (2012.01) |
| ***G01C 21/36*** | (2006.01) |

(56) References Cited

U.S. PATENT DOCUMENTS

| | | | | |
|---|---|---|---|---|
| 5,280,632 | A | 1/1994 | Jung-Gon | |
| 5,315,295 | A | 5/1994 | Fujii | |
| 5,617,086 | A | 4/1997 | Klashinsky et al. | |
| 5,635,920 | A | 6/1997 | Pogue et al. | |
| 5,642,093 | A | 6/1997 | Kinoshita et al. | |
| 5,757,949 | A | 5/1998 | Kinoshita et al. | |
| 5,904,728 | A | 5/1999 | Tamai et al. | |
| 5,944,768 | A | 8/1999 | Ito et al. | |
| 5,978,724 | A | 11/1999 | Sekine | |
| 5,978,731 | A | 11/1999 | Matsuda | |
| 5,983,389 | A * | 11/1999 | Shimizu | H03M 13/151 714/781 |
| 6,008,741 | A | 12/1999 | Shinagawa et al. | |
| 6,064,941 | A | 5/2000 | Nimura et al. | |
| 6,067,497 | A | 5/2000 | Sekine et al. | |
| 6,084,510 | A | 7/2000 | Lemelson et al. | |
| 6,088,659 | A | 7/2000 | Kelley et al. | |
| 6,092,005 | A | 7/2000 | Okada | |
| 6,092,014 | A | 7/2000 | Okada | |
| 6,141,619 | A | 10/2000 | Sekine | |
| 6,157,891 | A | 12/2000 | Lin | |
| 6,161,071 | A | 12/2000 | Shuman et al. | |
| 6,188,316 | B1 | 2/2001 | Matsuno et al. | |
| 6,199,011 | B1 | 3/2001 | Matsuda | |
| 6,204,778 | B1 | 3/2001 | Bergan et al. | |
| 6,208,927 | B1 | 3/2001 | Mine et al. | |
| 6,223,125 | B1 | 4/2001 | Hall | |
| 6,226,389 | B1 * | 5/2001 | Lemelson | G08G 1/166 382/104 |
| 6,298,296 | B1 | 10/2001 | Takahashi | |
| 6,343,253 | B1 | 1/2002 | Matsuura et al. | |
| 6,353,785 | B1 | 3/2002 | Shuman et al. | |
| 6,356,839 | B1 | 3/2002 | Monde et al. | |
| 6,370,475 | B1 * | 4/2002 | Breed | B60N 2/2863 340/436 |
| 6,381,536 | B1 | 4/2002 | Satoh et al. | |
| 6,389,332 | B1 | 5/2002 | Hess et al. | |
| 6,401,023 | B1 | 6/2002 | Takahashi | |
| 6,405,128 | B1 | 6/2002 | Bechtolsheim et al. | |
| 6,405,132 | B1 * | 6/2002 | Breed | B60N 2/002 701/117 |
| 6,411,896 | B1 * | 6/2002 | Shuman | G01C 21/32 340/425.5 |
| 6,415,222 | B1 | 7/2002 | Sato et al. | |
| 6,415,226 | B1 | 7/2002 | Kozak | |
| 6,424,904 | B1 | 7/2002 | Takahashi et al. | |
| 6,466,867 | B1 | 10/2002 | Sakashita | |
| 6,470,265 | B1 | 10/2002 | Tanaka | |
| 6,480,783 | B1 | 11/2002 | Myr | |
| 6,674,434 | B1 | 1/2004 | Chojnacki et al. | |
| 6,675,085 | B2 | 1/2004 | Straub | |
| 6,696,976 | B1 | 2/2004 | Hansen | |
| 6,718,262 | B2 | 4/2004 | Matsuda et al. | |
| 6,820,005 | B2 | 11/2004 | Matsuda et al. | |
| 6,850,841 | B1 | 2/2005 | Casino | |
| 6,856,902 | B1 | 2/2005 | Mitchem | |
| 6,864,784 | B1 | 3/2005 | Loeb | |
| 6,873,892 | B2 | 3/2005 | Katz et al. | |
| 6,895,332 | B2 * | 5/2005 | King | G01C 21/26 340/902 |
| 6,931,319 | B2 | 8/2005 | Adachi | |
| 6,952,647 | B2 | 10/2005 | Hasegawa et al. | |
| 6,954,696 | B2 | 10/2005 | Ihara et al. | |
| 7,007,011 | B1 | 2/2006 | Joshi | |
| 7,043,357 | B1 | 5/2006 | Stankoulov et al. | |
| 7,171,306 | B2 | 1/2007 | Hirose | |
| 7,184,073 | B2 | 2/2007 | Varadarajan et al. | |
| 7,194,347 | B2 | 3/2007 | Harumoto et al. | |
| 7,259,746 | B2 | 8/2007 | Kato et al. | |
| 7,266,438 | B2 | 9/2007 | Kellum et al. | |
| 7,340,341 | B2 | 3/2008 | Adachi | |
| 7,400,963 | B2 | 7/2008 | Lee et al. | |
| 7,479,897 | B2 | 1/2009 | Gertsch et al. | |
| 7,516,041 | B2 * | 4/2009 | Smartt | G01C 21/32 702/167 |
| 7,680,749 | B1 | 3/2010 | Golding et al. | |
| 7,751,973 | B2 | 7/2010 | Ibrahim | |
| 8,204,680 | B1 | 6/2012 | Dorum | |
| 8,571,811 | B1 | 10/2013 | Mueller | |
| 9,121,716 | B2 | 9/2015 | Denaro | |
| 2001/0001133 | A1 | 5/2001 | Hotta | |
| 2001/0020902 | A1 | 9/2001 | Tamura | |
| 2002/0069019 | A1 | 6/2002 | Lin | |
| 2002/0077733 | A1 | 6/2002 | Bidaud | |
| 2002/0128752 | A1 | 9/2002 | Joshi | |
| 2002/0161513 | A1 | 10/2002 | Bechtolsheim et al. | |
| 2002/0188400 | A1 | 12/2002 | Sato et al. | |
| 2002/0194016 | A1 | 12/2002 | Moribe et al. | |
| 2003/0005765 | A1 | 1/2003 | Brudis et al. | |
| 2003/0016145 | A1 | 1/2003 | Bateman | |
| 2003/0016146 | A1 | 1/2003 | Bates et al. | |
| 2003/0043059 | A1 | 3/2003 | Miller, Jr. | |
| 2003/0090392 | A1 | 5/2003 | Schuessler | |
| 2003/0130780 | A1 | 7/2003 | Shiimado et al. | |
| 2003/0182051 | A1 | 9/2003 | Yamamoto | |
| 2004/0022416 | A1 | 2/2004 | Lemelson et al. | |
| 2004/0030670 | A1 | 2/2004 | Barton | |
| 2004/0039523 | A1 | 2/2004 | Kainuma et al. | |
| 2004/0107042 | A1 | 6/2004 | Seick | |
| 2004/0107047 | A1 | 6/2004 | Joshi | |
| 2004/0143385 | A1 | 7/2004 | Smyth et al. | |
| 2004/0143390 | A1 | 7/2004 | King et al. | |
| 2004/0143391 | A1 * | 7/2004 | King | G01C 21/26 701/468 |
| 2004/0193347 | A1 | 9/2004 | Harumoto et al. | |
| 2004/0201495 | A1 * | 10/2004 | Lim | G08G 1/096716 340/905 |
| 2004/0201672 | A1 | 10/2004 | Varadarajan et al. | |
| 2004/0267455 | A1 | 12/2004 | Hatano et al. | |
| 2005/0065682 | A1 | 3/2005 | Kapadia et al. | |
| 2005/0149251 | A1 | 7/2005 | Donath et al. | |
| 2005/0192746 | A1 * | 9/2005 | King | G01C 21/26 701/468 |
| 2005/0240334 | A1 | 10/2005 | Matsumoto et al. | |
| 2005/0251335 | A1 | 11/2005 | Ibrahim | |
| 2005/0264404 | A1 * | 12/2005 | Franczyk | G08G 1/096716 340/441 |
| 2006/0041372 | A1 | 2/2006 | Kubota et al. | |
| 2006/0064239 | A1 | 3/2006 | Ishii | |
| 2006/0097859 | A1 | 5/2006 | Nordbruch | |
| 2006/0109095 | A1 | 5/2006 | Takata et al. | |
| 2006/0114125 | A1 | 6/2006 | Kubota et al. | |
| 2006/0149780 | A1 | 7/2006 | Joshi | |
| 2006/0220904 | A1 | 10/2006 | Jarlengrip | |
| 2006/0287817 | A1 | 12/2006 | Nagel | |
| 2007/0008090 | A1 | 1/2007 | Gertsch et al. | |
| 2007/0021910 | A1 | 1/2007 | Iwami et al. | |
| 2007/0027583 | A1 | 2/2007 | Tamir et al. | |
| 2007/0040705 | A1 | 2/2007 | Yoshioka et al. | |
| 2007/0050127 | A1 | 3/2007 | Kellum et al. | |
| 2007/0050130 | A1 | 3/2007 | Grimm et al. | |
| 2007/0162019 | A1 | 7/2007 | Burns et al. | |
| 2007/0192020 | A1 | 8/2007 | Brulle-Drews et al. | |
| 2007/0288158 | A1 | 12/2007 | Dorum | |
| 2007/0296574 | A1 | 12/2007 | Smith et al. | |
| 2008/0004806 | A1 | 1/2008 | Kimura et al. | |
| 2008/0033621 | A1 | 2/2008 | Nakamura et al. | |
| 2008/0077309 | A1 | 3/2008 | Cobbold | |
| 2008/0169914 | A1 | 7/2008 | Albertson et al. | |
| 2008/0215238 | A1 | 9/2008 | Geelen et al. | |
| 2008/0243380 | A1 | 10/2008 | Han | |

(56) References Cited

U.S. PATENT DOCUMENTS

| | | | |
|---|---|---|---|
| 2009/0140887 | A1 | 6/2009 | Breed et al. |
| 2009/0144030 | A1 | 6/2009 | Witmer |
| 2009/0295598 | A1 | 12/2009 | Denaro |
| 2009/0295604 | A1 | 12/2009 | Denaro |
| 2009/0296630 | A1 | 12/2009 | Chen et al. |
| 2009/0299615 | A1 | 12/2009 | Denaro |
| 2009/0299616 | A1 | 12/2009 | Denaro |
| 2009/0299617 | A1 | 12/2009 | Denaro |
| 2009/0299622 | A1 | 12/2009 | Denaro |
| 2009/0299624 | A1 | 12/2009 | Denaro |
| 2009/0299625 | A1 | 12/2009 | Denaro |
| 2009/0299626 | A1 | 12/2009 | Denaro |
| 2009/0299630 | A1 | 12/2009 | Denaro |
| 2009/0300035 | A1 | 12/2009 | Denaro |
| 2009/0300053 | A1 | 12/2009 | Denaro |
| 2009/0300067 | A1 | 12/2009 | Denaro |
| 2010/0001133 | A1 | 1/2010 | Kempa et al. |
| 2010/0121886 | A1 | 5/2010 | Koshiba et al. |
| 2010/0191421 | A1 | 7/2010 | Nilsson |
| 2010/0332266 | A1 | 12/2010 | Tamir et al. |

OTHER PUBLICATIONS

European Search Report for related European Application No. 09251231.8 dated Apr. 5, 2016.

* cited by examiner 10
14
16
18
20
22
24
26

20
28
30
32
34
36
38
40
42
44
46
48
50
52
54
56
58
- node
- shape point

VEHICLE 300
USER INTERFACE 354
VEHICLE SYSTEMS 310
ROUTE CALCULATION 344
MAP DISPLAY 346
NAVIGATION 340
POSITIONING 320
POSITIONING APPLICATION 324
HARDWARE (GPS, INS) 322
PRECAUTIONARY ACTION APPLICATION 350
LOCAL DATA STORAGE 334
MAP DB 330
CONTROL SYSTEMS/ ACTUATORS 356
BRAKES 356(1)
ENGINE 356(2)
SEATBELTS 356(3)
AIRBAGS 356(4)
other 356(5)

DATA MINING IN A DIGITAL MAP DATABASE TO IDENTIFY DECREASING RADIUS OF CURVATURE ALONG ROADS AND ENABLING PRECAUTIONARY ACTIONS IN A VEHICLE

REFERENCE TO RELATED APPLICATIONS

This application is a continuation under 37 C.F.R. § 1.53(b) of U.S. patent application Ser. No. 14/196,640 filed Mar. 4, 2014 now U.S. Pat. No. 10,012,510, which is a continuation under 37 C.F.R. § 1.53(b) of U.S. patent application Ser. No. 12/156,224 filed May 30, 2008 now U.S. Pat. No. 8,698,649, the entire disclosures of which is hereby incorporated by reference. The present patent application is related to patent application Ser. No. 12/156,264, filed on May 30, 2008, now U.S. Pat. No. 9,134,133, entitled "DATA MINING TO IDENTIFY LOCATIONS OF POTENTIALLY HAZARDOUS CONDITIONS FOR VEHICLE OPERATION AND USE THEREOF," the entire disclosure of which is incorporated by reference herein.

BACKGROUND

The present invention relates to a method and system that enables taking a precautionary action in a vehicle, such as providing a warning to a vehicle driver about a potentially difficult or hazardous driving condition on the road network.

Advanced driver assistance systems ("ADAS"), including active safety and fuel economy systems, have been developed to improve the comfort, efficiency, safety, and overall satisfaction of driving. Examples of these advanced driver assistance systems include adaptive headlight aiming, adaptive cruise control, lane departure warning and control, curve warning, speed limit notification, hazard warning, predictive cruise control, and adaptive shift control, as well as others. Some of these advanced driver assistance systems use a variety of sensor mechanisms in the vehicle to determine the current state of the vehicle and the current state of the roadway in front of the vehicle. These sensor mechanisms may include radar, infrared, ultrasonic and vision-oriented sensors, such as digital video cameras and lidar. Some advanced driver assistance systems also use digital map data. Digital map data can be used in advanced driver assistance systems to provide information about the road network, road geometry, road conditions and other items associated with the road and terrain around the vehicle. Digital map data is not affected by environmental conditions, such as fog, rain or snow. In addition, digital map data can provide useful information that cannot reliably be provided by cameras or radar, such as curvature, grade, bank, speed limits that are not indicated by signage, traffic and lane restrictions, etc. Further, digital map data can provide a predictive capability well beyond the range of other sensors or even beyond the driver's vision to determine the road ahead of the vehicle, around corners, over hills or beyond obstructions. Accordingly, digital map data can be a useful addition for some advanced driver assistance systems.

Although these kinds of systems provide useful features, there exists room for further improvements. For example, it would be useful to identify locations on the road network where a relatively high number of traffic accidents have occurred. However, statistics pertaining to accidents are maintained by various different administrative entities that use different formats, standards, reporting methods, reporting periods, etc. Accordingly, it is difficult to obtain consistent information about traffic accidents on roads in a large geographic region, such as the entire United States or Europe. Moreover, data indicating locations where a statistically large number of traffic accidents occur may not indicate the causes of the accidents or how accidents can be avoided.

Accordingly, it is an objective to provide a system that facilitates taking a precautionary action in a vehicle, such as providing a warning to a vehicle operator, when approaching a location where accidents may occur.

DETAILED DESCRIPTION OF THE DRAWINGS AND PRESENTLY PREFERRED EMBODIMENTS

To address these and other objectives, the present invention comprises a feature that enables taking a precautionary action in a vehicle as the vehicle approaches the location of a curve that has a decreasing radius of curvature. The precautionary action may be a warning message provided to the vehicle driver to alert the vehicle driver about the curve with the decreasing radius of curvature so that the vehicle driver can pay extra attention. Alternatively, the precautionary action may be an actual modification of the operation or control of the vehicle, such as braking, accelerating, or maneuvering the vehicle, or activating a sensor. Alternatively, the precautionary action may be providing an input to an algorithm that also processes inputs from other sensors for taking such actions. In another alternative, the precautionary action may include a combination of any of these aforementioned actions.

According to another aspect, a database that represents the road network is used to determine locations where there are curves with decreasing radii of curvature. Then, precautionary action data is added to the database to indicate each location at which a precautionary action is to be provided about a curve with a decreasing radius of curvature.

According to further aspects, a precautionary action system installed in a vehicle uses this database, or a database derived therefrom, in combination with a positioning system, to determine when the vehicle is at a location that corresponds to the location where a precautionary action should be taken. When the vehicle is at such a location, the precautionary action is taken, such as providing a warning to the vehicle operator, as the vehicle is approaching a curve with a decreasing radius of curvature. Alternatively, the precautionary action may consist of an actual modification of the operation or control of the vehicle, such as braking, accelerating, or maneuvering the vehicle, or activating a sensor. Alternatively, the precautionary action may include providing an input to an algorithm that also processes inputs from other sensors for taking such actions. Alternatively, the precautionary action may be an adjustment of sensitivities of other ADAS applications such as increasing the control authority and sensitivity of a lane departure warning or control system to lane edge approach and violation. In another alternative, the precautionary action may include a combination of any of these aforementioned actions.

Figures 1A, 1B:
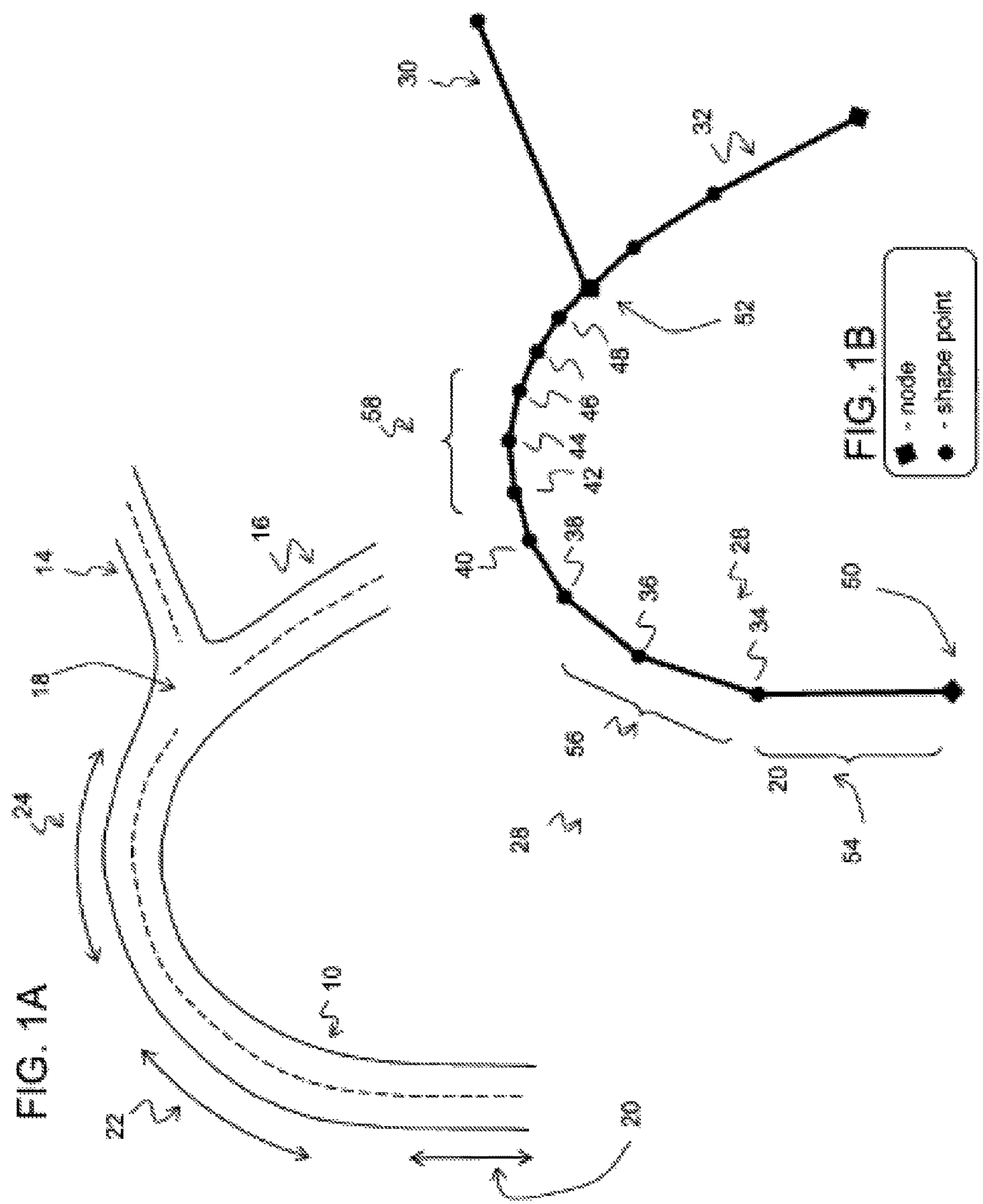
FIG. 1A is an illustration of a portion of a road network with a curve with a decreasing radius of curvature.
FIG. 1B is an illustration of how the portion of a road network shown in FIG. 1A is represented as data in a database.

FIG. 1A depicts road segments 10, 12 and 14. The road segments 10, 12 and 14 meet at an intersection 16. As shown in FIG. 1A, the road segment 10 is curved. The degree by which a road segment curves is described by its curvature. There are various ways to indicate or measure curvature. Curvature refers to a property of a road segment and is an indication of how much the road is curved. As shown in FIG. 1A, the road segment 10 starts out with a straight portion 18, followed by a portion 20 that is moderately curved, which is followed a portion 22 that is more curved.

Figure 2:
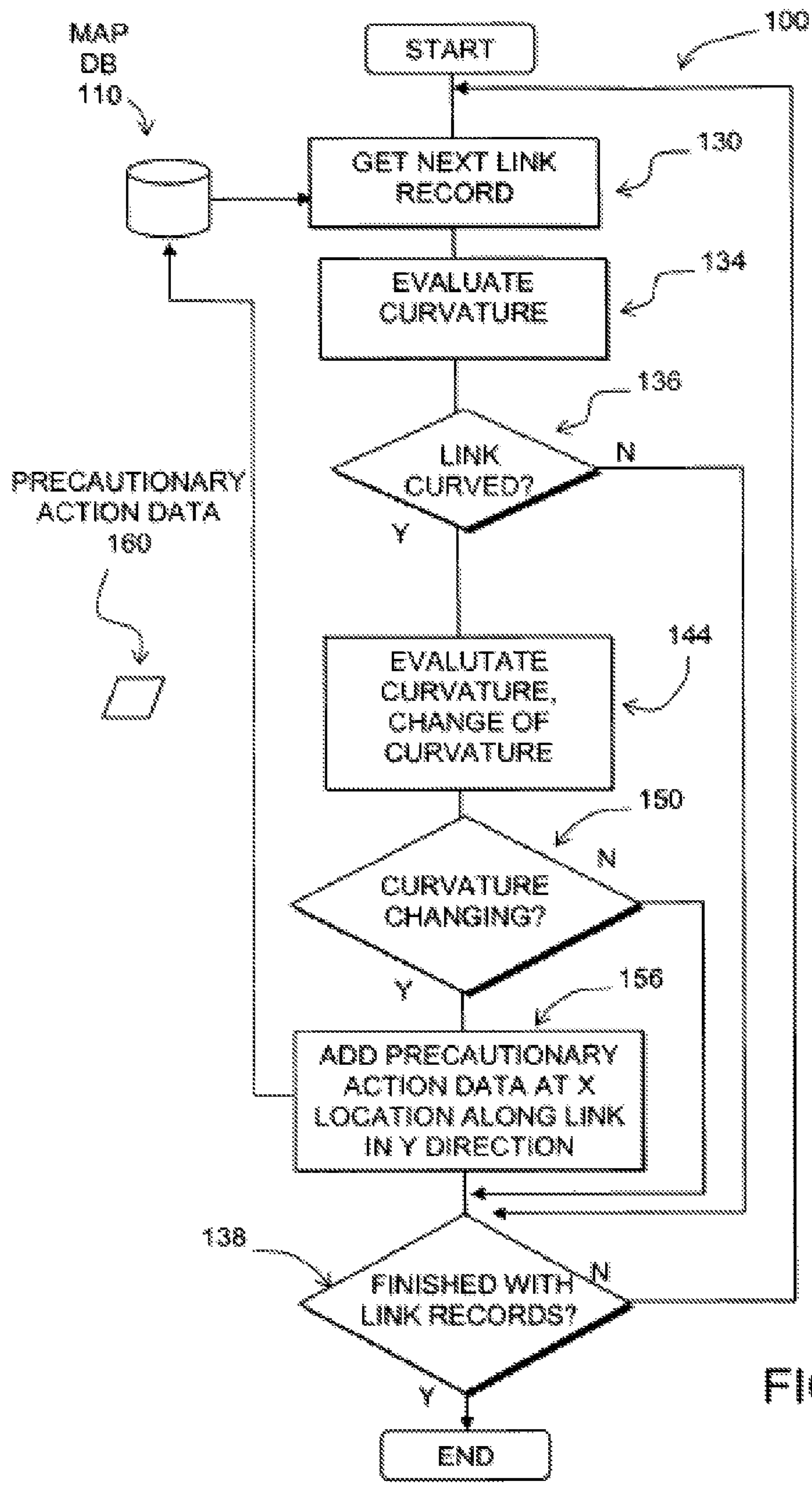
FIG. 2 is a flowchart of a process that uses a database that represents a road network to identify conditions such as the one shown in FIG. 1.

FIG. 1B is an illustration of how the road segments in FIG. 1A are represented by data contained in a map database (such as the database 110 in FIG. 2). The road segments are each represented by a data record that defines a line that extends between two endpoints, or nodes. The location of the road segment is defined by the data indicating the locations (e.g., geographic coordinates, including altitude) of the nodes. As shown in FIG. 1B, the road segment 10 is represented by the line 28, the road segment 12 is represented by the line 30, and the road segment 14 is represented by the line 32.

The data record that represents each road segment includes data that indicates the shape of the road segment. One way to represent the shape of the road segment is to define shape points along the road segment. Shape points indicate the geographic coordinates at points along the road segment between the nodes. In the case of a straight road segment, no shape points are required. However, in the case of a curved road segment, one or more shape points are used to define locations along the road segment. FIG. 1B shows several shape points, 34, 36, 38 . . . 48, defined along the road segment between the endpoints, i.e., nodes 50 and 52. Thus, the curved road segment 10 in FIG. 1A is represented by an approximation 28 comprised of a series of short, straight lines as shown in FIG. 1B. (Alternatively, a database may represent a curved road segment by a curved line, such as a spline, clothoid, etc. In this alternative, data that defines the curved line is included in the database.) As indicated in FIG. 1B, in the first portion 54 of the line 28, which corresponds to the straight portion 20 of road segment 10 in FIG. 1A, there are no shape points. In the portion 56 of the line 28, which corresponds to the curved portion 22 of the road segment 10 in FIG. 1A, there are a series of shape points, 34, 36 and 38. In the portion 58 of the line 28, which corresponds to the more curved portion 24 of the road segment 10 in FIG. 1A, there are a series of shape points, 40, 42, 44, 46 and 48, which are more closely spaced together than those in portion 56.

FIG. 2 is a flowchart of a process 100. The process 100 is performed by a software program or routine that is run on a suitable computing platform, such as a database server, PC or plurality of PCs coupled together for parallel computing applications.

The process 100 uses a database 110 that contains data that represents the road network in a region. The region may be a country, such as the United States, Germany, France or Korea. Alternatively, the region may include several countries or an entire continent. According to another alternative, the region may include only a portion of a country, such as a state or several states or metropolitan areas.

The process 100 is performed by a map developer, such as NAVTEQ Corporation. Alternatively, the process 100 may be performed by another entity that has access to an editable version of a map database 110. For example, the process may be performed by a customer or licensee of NAVTEQ, such as a manufacturer of navigation systems or active safety systems, or by a traffic information services company or by a government office at any level.

The database 110 is in a format that can be edited. That is, new or updated information can be added to the database 110. Alternatively, the database 110 is in a format such that new information can be combined with the original data to form a new database that includes both the original data and new data. In one embodiment, the database is in an Oracle spatial format. Alternatively, the database may be in delivery format, such as GDF (Geographic Data File), SIF (Standard Interchange Format), or other formats, including proprietary formats.

As stated above, the database 110 contains data that represents the road network in the region. The database 110 contains information such as the locations (geographic coordinates, including altitude) of roads and intersections, road names, the three-dimensional shape of the roads including curvature, slope and bank, speed limits along roads, turn restrictions at intersections, addresses or address ranges along roads, the number of lanes each road has, lane width, lane markings, functional classes of roads, the locations of medians, and so on. The database may also contain information about other geographic features, such as bodies of water, parks, administrative areas (including municipal, state and country boundaries), and locations of points of interest, such as businesses, hospitals, police stations, and so on.

In FIG. 2, the process 100 examines each data record that represents a road segment (also referred to herein as a “link”) to determine whether it represents one similar to the road segment 10 in FIG. 1A. (The process 100 may use a procedure that examines in turn each data record that represents each road segment represented in the entire database.) In one step, a data record that represents a link or road segment is read from the database 110 (Step 130). This road segment record may include data (e.g., shape points) that indicate whether the road segment is curved. This data is evaluated (Step 134). If the represented road segment is not curved, the process 100 proceeds to a step in which it is determined whether all the road segment records in the database have been examined (Steps 136 and 138). If there are more segment records to examine, the process 100 proceeds to get the next segment record (Step 130) and continues.

Referring back to Step 136, if the represented road segment is curved, the process 100 proceeds to evaluate the data that indicates the curvature along the road segment's curved portion to determine whether the curvature changes, i.e., increases, in a given direction (Step 144). More specifically, the process evaluates the curvature to determine if curvature is approximately constant for a given length, and then increases in curvature to a higher value for another length. The process may use a threshold by which the curvature is required to increase to determine that the condition is met. The process may use the spacing between shape points to determine whether the curvature increases along the length of a road segment. From an evaluation of the degree of curvature, as well as the amount by which the curvature changes, it is determined whether there exists a sufficiently large change in curvature to constitute a potentially hazardous condition (such as the change in curvature between the sections 22 and 24 shown in FIG. 1A). If examination of the segment's curvature indicates that there is not a sufficiently large change in curvature between adjacent portions of the road, the process 100 proceeds to the step in which it is determined whether all the road segment records in the database have been examined (Step 138) and if there are more segment records to examine, the process 100 proceeds to get the next segment record (Step 130).

Referring back to Step 150, if examination of the segment's curvature between adjacent sections indicates that there is a sufficiently large change between sections, the process 100 adds precautionary action data 160 to the database 110 (Step 156). The precautionary action data 160 indicates the presence of a feature in the road network where a precautionary action may be taken.

After the precautionary action data 160 is added to the database 110, the process 100 proceeds to the step in which it is determined whether all the road segment records in the database have been examined (Step 138) and if there are more segment records to examine, the process 100 proceeds to get the next segment record (Step 130).

The process 100 ends when it is determined whether all the road segment records have been examined (Step 138).

It is noted that the process 100, above, performs a data mining function. The existence of the potentially difficult location, i.e., a significant increase in curvature between adjacent road sections along a curve, is derived from data already collected and present in the database. It is noted that the process 100, above, evaluates multiple data items in the original database, to determine whether the condition exists, in this case, adjacent road sections in which the curvature increases by a significant amount. By evaluating these multiple data items, a determination is made whether these multiple data items describe the condition of interest. If these data items do describe the condition, a new data item, i.e., the precautionary action data, is added to the database.

The above process for determining whether a sufficiently large increase in curvature exists between adjacent road sections can take into account other factors, such as speed limits, road surface, the presence and type of shoulders, and so on. According to this alternative, the threshold may take into account the speed limit along the road segment (which is also stored as data in the database 110.)

Figure 3:
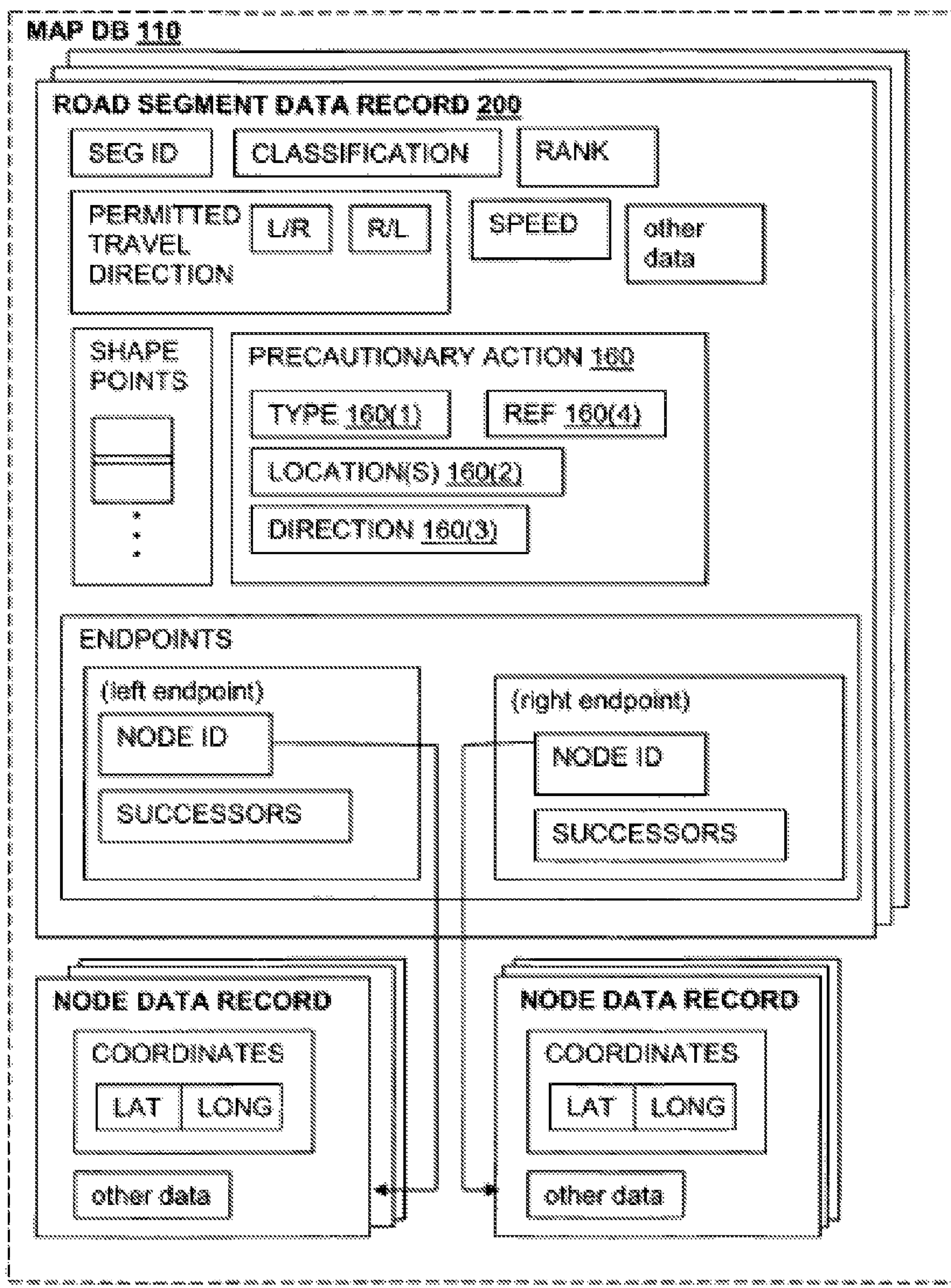
FIG. 3 is a diagram of a data record formed by the process of FIG. 2.

FIG. 3 is a diagram that shows a data record 200 in the database 110. The data record 200 represents a road segment located in a geographic region. As explained above, the geographic region may include an entire country or continent. Accordingly, the database 110 includes many data records like the one shown in FIG. 3.

The data record 200 shown in FIG. 3 is exemplary and shows only one way to represent a road segment. Databases may represent road segments in various different ways and may include different kinds of information. The present invention is not limited to any particular way of representing roads.

Referring to FIG. 3, various data are associated with the data record 200 that represents a road segment. This various data indicates features or attributes of the represented road segment. For example, associated with the data record is data that indicates the permitted direction(s) of travel. Also associated with the road segment record 200 are data that indicate a speed limit, a classification of the road segment (i.e., the type of road, such as controlled access, etc.), a rank (e.g., 1-4), the endpoints of the road segment, shape points (i.e., locations along the road segment between its endpoints). Also associated with the road segment records is data that indicate the successors at each endpoint. Successors are those road segments that connect to the represented road segment at each of its endpoints. The segment record 200 may identify these successors by reference to the data records that represent the successors.

In FIG. 3, the database 110 also includes precautionary action data 160. The precautionary action data 160 is the data added to the database 110 by the process 100 in FIG. 2. In FIG. 3, the precautionary action data 160 is shown as added to the road segment record 200. It should be understood that the process 100 adds precautionary action data 160 with respect to only certain records, i.e., records that represent those roads segments that meet the conditions identified by the process. Accordingly, the database 110 will contain data records that represent road segments that contain the precautionary action data 160 and other data records that represent road segments that do not contain the precautionary action data 160.

In the embodiment shown in FIG. 3, the precautionary action data 160 is associated with the road segment identified as having a significant increase in curvature between adjacent road sections along a curve. In this embodiment, the precautionary action data 160 includes several components. One component 160(1) indicates a condition type. This condition type 160(1) indicates the type of condition about which a precautionary action is to be taken, which in this case is a significant increase in curvature between adjacent road sections along a curve. This condition type 160(1) component is used when different conditions are identified in the database 110 about which precautionary action may be taken.

Another component of the precautionary action data 160 is the precautionary action location 160(2). The precautionary action location 160(2) indicates where along the represented road segment a precautionary action may be taken. The precautionary action location 160(2) data may include multiple entries. For example, the precautionary action location 160(2) may indicate where a warning may be provided to a vehicle driver to advise the driver about the upcoming condition, i.e., the significant increase in curvature between adjacent road sections along a curve. In the case of a significant increase in curvature between adjacent road sections along a curve, the warning location 160(2) may indicate a distance (e.g., x meters) from the changing curvature. The location 160(2) is determined based on an analysis of factors, such as the superelevation, curvature, the change of curvature, the speed limit along the represented road segment, the road classification, and possibly other factors. These factors may be determined from other data contained in the database 110. According to one example, the location 160(2) may indicate that a warning should be provided at a location 400 meters along the road segment from the curve.

The precautionary action location 160(2) may also indicate where a vehicle control action should be taken, such as tightening the seatbelts, pre-loading or engaging the brakes, tightening sensitivities of lane departure warning systems or stability control systems, etc. This may be a different location from where the precautionary warning is provided and would be based on a different analysis of factors.

Another component of the precautionary action data 160 is direction data 160(3). The direction data 160(3) indicates the direction along the represented road segment where the precautionary action should be taken. In this case, the direction data 160(3) would indicate the direction in which the curvature increases as one travels along the road. (Note that the database 110 may indicate a direction along a road segment as positive or negative based on the relative latitude and longitude of the road segment endpoints.)

Another component of the precautionary action data 160 is a reference 160(4). In this case, the reference 160(4) indicates the location of the significant increase in curvature between adjacent road sections along a curve. The reference 160(4) refers to shape points that represent the curved portions of the road.

The precautionary action data 160 described in FIG. 3 is one way that this data may be included in a database that represents a geographic region. There are alternative ways to include the precautionary action data. For example, the precautionary action data may be included as separate data records in the database 110. If included as separate data records, the precautionary action data may be associated with the road segments to which they apply by pointers or other suitable data references. Alternatively, the precautionary action data may be associated with node data records, instead of the road segments leading to the intersections. Various other ways exist and the present invention is not intended to be restricted to any specific implementation.

Figure 4:
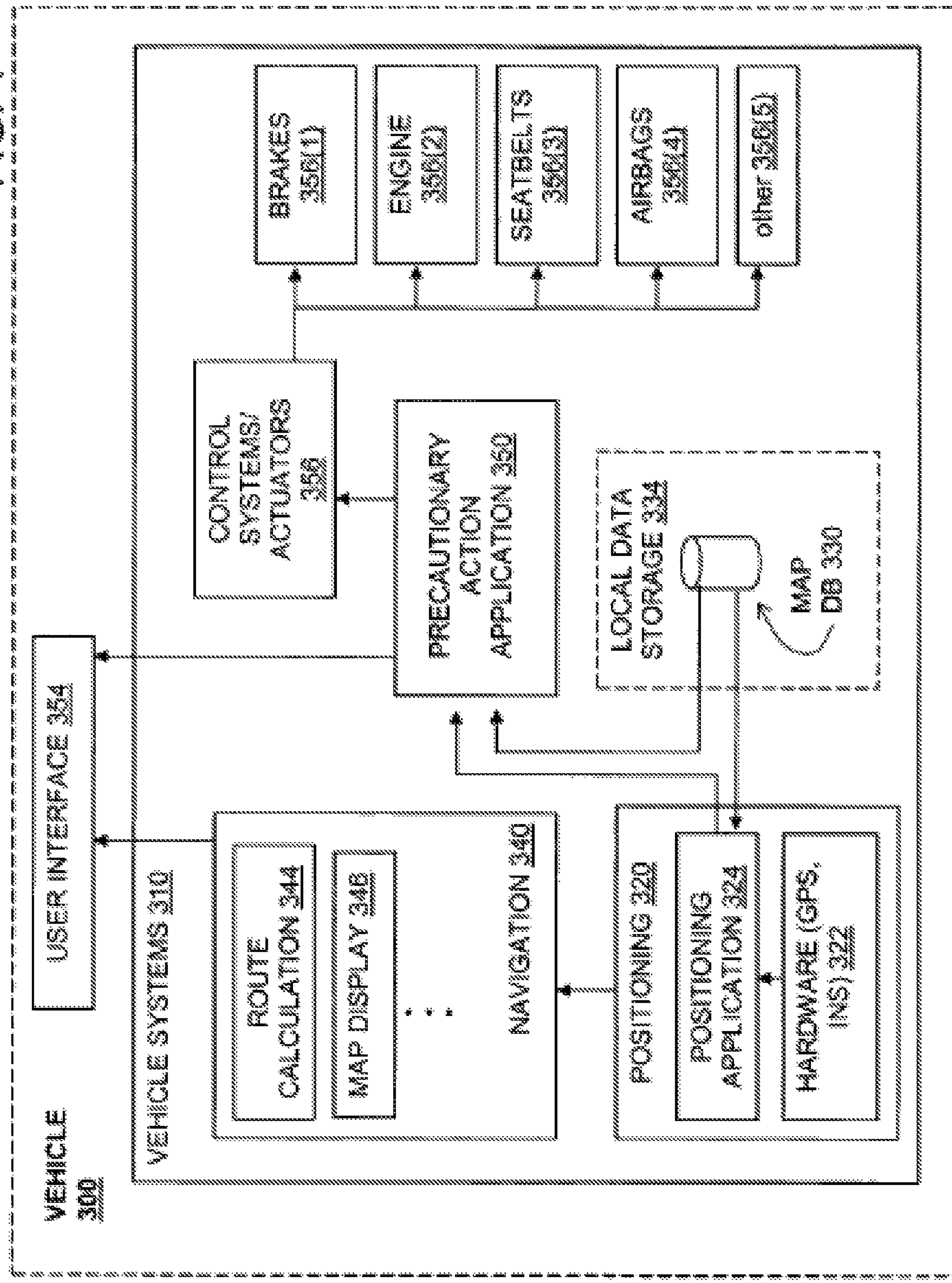
FIG. 4 is a diagram of a vehicle system that uses data produced by the process of FIG. 2.

FIG. 4 is a diagram depicting components of a vehicle 300. The vehicle 300 is operated on a road network, such as the road network represented by the database 110 in FIG. 2. The vehicle 300 may be an automobile, truck, bicycle, motorcycle, etc.

The vehicle 300 includes systems 310. In this embodiment, the vehicle systems 310 include a positioning system 320. The positioning system 320 determines the position of the vehicle 300 on the road network. The positioning system 320 includes appropriate hardware and software to determine the position of the vehicle 300. For example, the positioning system may include hardware 322 that includes a GPS unit, an accelerometer, wheel speed sensors, etc. The positioning system 320 also includes a positioning application 324. The positioning application 324 is a software application that uses outputs from the positioning system hardware 322 and information from a map database 330. The positioning application 324 determines the position of the vehicle 300 with respect to the road network, including the location of the vehicle 300 along a road segment and a direction of travel of the vehicle along the road segment.

In one embodiment, the map database 330 is located in the vehicle. In an alternative embodiment, the map database 330 may be located remotely and accessed by the vehicle systems 310 using a wireless communication system. In yet another embodiment, part of the map database 330 may be located locally in the vehicle and part of the map database 330 may be located remotely.

The map database 330 is stored on a computer readable medium 334. The computer-readable medium may be implemented using any suitable technology. For example, the computer readable medium may be a DVD disk, a CD-ROM disk, a hard disk, flash memory, or any other medium, or a plurality of media.

The map database 330 includes data that represents the geographic region in which the vehicle 300 is being operated. The map database 330 may represent the same geographic region as the database 110 in FIG. 2, or alternatively, the map database 330 may represent only a portion of the region represented by the database 110.

The map database 330 used by the vehicle systems 310 may be in a different format from the database 110 in FIG. 2. The map database 330 is formed or derived from the database 110 by a compilation process that organizes and presents the data in a form and format that specifically facilitates its use for performing specific functions. For example, the map database 330 may be separated into different collections of data that are used for specific functions, such as vehicle positioning, route calculation, map display, route guidance, destination selection, and so on. The map database 330 may also be organized into groupings spatially. One kind of compiled database format is disclosed in U.S. Pat. No. 5,968,109, the entire disclosure of which is incorporated by reference herein. Various other compiled database formats exist, including proprietary formats, and the disclosed embodiment(s) are not limited to any particular format.

Included among the vehicle systems 310 in FIG. 4 is a navigation system 340. The navigation system 340 uses outputs from the positioning system 320 and data from the map database 330 to provide navigation-related features to a vehicle user, e.g., the vehicle operator or passenger. The navigation system 340 includes applications for route calculation 344, map display 346, as well as possibly other applications. The navigation system 340 provides the navigation-related features to the vehicle user via a user interface 354. (The navigation system 340 is optional and may be omitted.)

Also included among the vehicle systems 310 is a precautionary action application 350. The precautionary action application 350 uses outputs from the positioning system 320 and data from the map database 330 to take precautionary actions, such as provide warnings to the vehicle operator. The precautionary action application 350 provides the warning to the vehicle operator via the user interface 354.

FIG. 4 also shows that precautionary action application 350 provides an output to vehicle control systems and actuator 356. The vehicle control systems and actuator are operatively connected to various vehicle mechanical systems, such as the vehicle's brakes 356(1), engine 356(2), seatbelts (including tensioners) 356(3), airbags 356(4), stability control algorithms, as well as other system systems 356(5).

Figure 5:
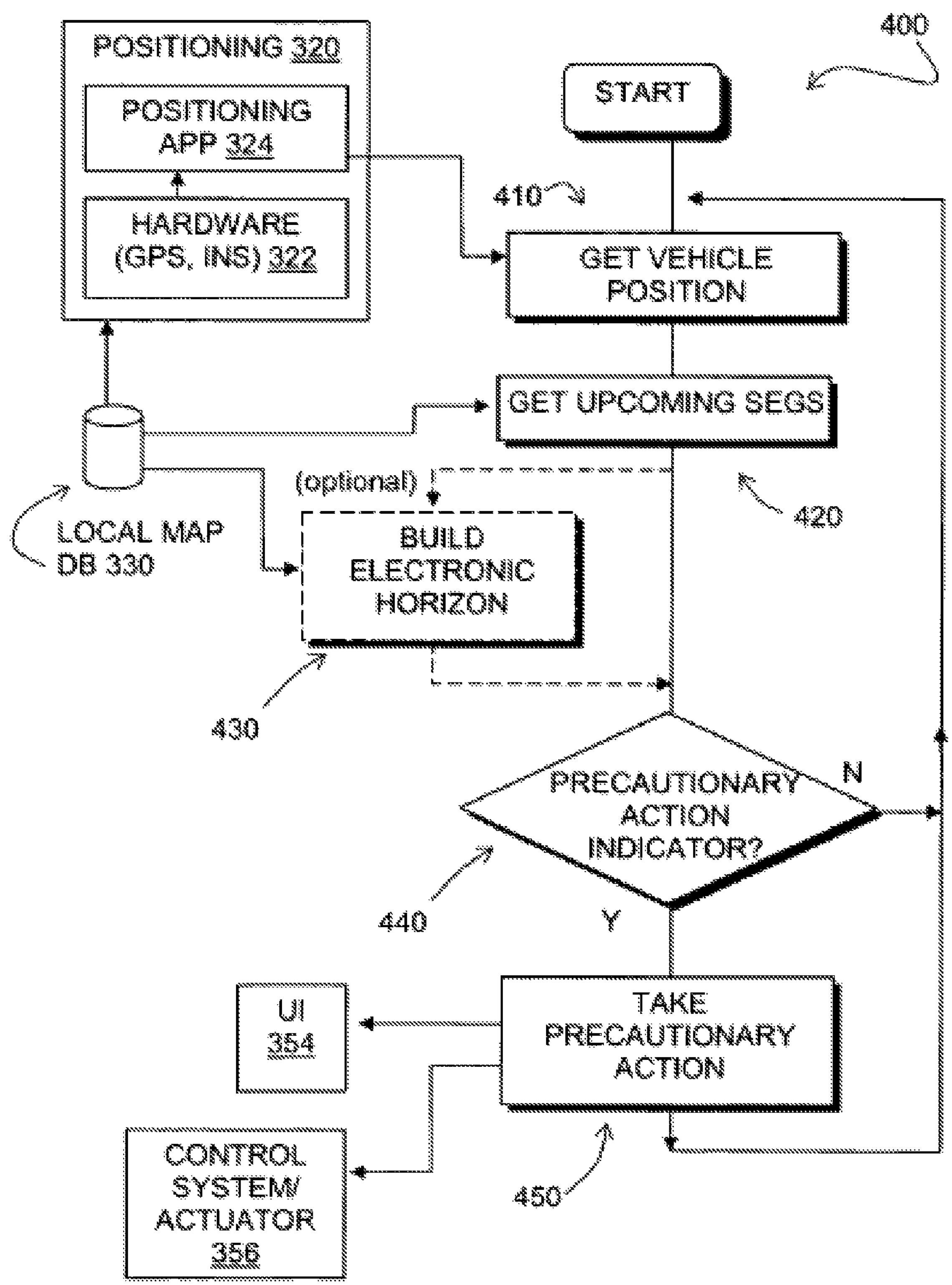
FIG. 5 is a flowchart of a process performed by the system of FIG. 4.

FIG. 5 is a flowchart 400 showing operation of the precautionary action application 350 (in FIG. 4). As the vehicle 300 (in FIG. 4) is being operated on a road, the precautionary action application 350 obtains the current vehicle position from the positioning system 320 (Step 410). (During vehicle operation, the positioning system 320 continuously determines the current geographic position of the vehicle 300 as the vehicle is being operated using data from the map database 330.) The positioning system 320 provides the precautionary action application with data that indicates the current vehicle position with respect to the road network as represented by the map database 330. Specifically, the location of the vehicle along a road segment and the direction of travel of the vehicle along the road segment are determined and provided to the precautionary action application 350.

Next, the process 400 obtains data from the map database 300 that represents the geographic features (i.e., roads, intersections, etc.) at the current location of the vehicle and in the direction in which the vehicle is heading (Step 420). In one embodiment, an electronic horizon is used (Step 430). Building an electronic horizon and using it to provide warnings are disclosed in U.S. Pat. Nos. 6,405,128 and 6,735,515 and U.S. patent application Ser. No. 11/400,151, the entire disclosures of which are incorporated by reference herein. Using an electronic horizon and/or the inventions disclosed in these patents and pending patent application is optional and the disclosed process 400 is not limited to using the electronic horizon technology.

After obtaining data from the map database 300 that represents the geographic features at the current location of the vehicle and in the direction in which the vehicle is heading, the process 400 includes the step of examining the data to determine whether any precautionary action data (160 in FIG. 3) is associated with the represented geographic features (Step 440). If there is no precautionary action data associated with the represented geographic features, the process 400 loops back to get a new current vehicle position (Step 410). On the other hand, if there is precautionary action data associated with the represented geographic features, the process 400 takes a precautionary action (Step 450). The precautionary action may be a warning provided to the vehicle operator when the vehicle is at the location (i.e., 160(2) in FIG. 3) indicated by the precautionary action data. The warning may be provided via the user interface 354. The warning may be an audible warning message or a visual warning.

The precautionary action is not limited to warnings, but may also include other actions. For example, in the case of a significant increase in curvature between adjacent road sections along a curve, vehicle systems 356, such as the brakes, engine or transmission, can be readied for a deceleration. In addition, the seatbelts may be tightened or the airbags set to deploy. As explained above, to facilitate these kinds of actions, additional information may be added to the warning data 160 (in FIG. 3) to indicate the type of action as well as the location where the action should be taken.

Referring still to FIG. 5, after taking the precautionary action, the process 400 loops back to get a new current vehicle position (Step 410).

Alternative with Dynamic Data

The process (400 in FIG. 5) was described as a way to use the precautionary action data that had been stored in the map database to take an appropriate action in a vehicle when the vehicle is at or is approaching a location identified as having a potentially hazardous condition. This process uses a positioning system and map database in the vehicle to determine when the vehicle is at or is approaching such a location. The process may also take into account dynamic information. Dynamic information may include current traffic and weather conditions, ambient light conditions, road conditions (e.g., ice), and so on. The vehicle may include systems to obtain such information. For example, the vehicle may have a traffic data receiver that obtains real-time traffic information, e.g., RDS-TMC messages. The process 400 may use the dynamic information in combination with the precautionary action data. For example, the process may modify the location at which a warning is provided. As an example, if weather conditions indicate that it is raining, the location at which a warning is provided to the vehicle driver about an upcoming curve with a significant increase in curvature between adjacent road sections along a curve may be modified, i.e., adjusted to a point farther in advance of the location of the hazardous condition, in order to give the vehicle operator additional time or distance. The process may even take certain actions only under certain conditions. For example, a warning about a significant increase in curvature between adjacent road sections along a curve may be provided only during nighttime hours or during inclement weather conditions.

Verification

The process (100 in FIG. 2) was described as a way to automatically examine records in a database that represents roads to identify locations or conditions along the road network where a precautionary action might be taken. According to the described process, data is then added to indicate the location where the precautionary action should be taken. Alternatively, instead of automatically adding the precautionary action data to the database, the locations where such conditions are identified could be marked on a temporary basis. Then, a geographic analyst (or other human operator) could review some or all such temporarily marked locations. The analyst may conduct this review by physically traveling to the locations or by reviewing satellite or aerial photographs of the locations, or video taken while driving by the locations (previously or subsequently acquired either by the analyst or others including members of the public). Based on the review, the analyst then determines whether precautionary action data should be added to the database.

It is intended that the foregoing detailed description be regarded as illustrative rather than limiting and that it is understood that the following claims including all equivalents are intended to define the scope of the invention.

I claim:

1. A database stored on a non-transitory computer-readable medium, wherein the database includes data that represents a road network in a geographic region, wherein the database comprises:

data records that represent road segments that make up the road network; and data that indicates precautionary action locations, wherein a precautionary action location is associated with a location at which a combination of conditions exists, wherein the data that indicates precautionary action locations was formed by a process wherein data records that represent road segments, and which include data indicative of characteristics thereof, are selected from the database to determine those road segments whose characteristics satisfy the combination of conditions; and wherein the characteristics comprise incline of the road segment and whether the road segment intersects with another road segment, wherein selection is based on the combination of an intersection being located at the bottom of a hill.

2. The database of claim 1 wherein characteristics comprise curvature and degree thereof of the road segment wherein the selection is based the combination of a curved road segment having a lesser degree of curvature than an adjacent curved road section in one direction of travel.

3. The database of claim 1 wherein the database is configured prior to operation of a vehicle.

4. The database of claim 1 wherein the combination of conditions further comprises a combination of two conditions which are satisfied together at a same location along the road segment of the road network, wherein the satisfaction of the two conditions is determined by evaluating other data, representative of geographic features located at the location, in the database to determine if a first of the two conditions is satisfied thereby at the location and, upon determining satisfaction of the first condition, evaluating data in the database that represent geographic features located at or around the location of the first condition to determine if a second of the two conditions is satisfied.

5. The database of claim 1 wherein at least one condition of the combination of conditions is undetectable by at least one sensor provided on a vehicle prior to approach of the associated location thereby.

6. A method for providing a precautionary action to an operator of a vehicle when the vehicle approaches a potentially hazardous location along a road of a road network, wherein the component comprises an augmented version of a database that represents the road network in a geographic region, the method comprising:

determining a type of hazardous condition to identify which may impair control of the vehicle, and, based thereon, identify a first condition and a second condition, the satisfaction thereof at a same location is indicative of the hazardous condition, wherein the first condition comprises existence of a first feature at a location represented in the database, that an attribute of the first feature exceeds a threshold or a combination thereof, and the second condition comprises existence of a second feature at or around the location, that an attribute of the second feature exceeds a threshold, or a combination thereof;

evaluating, prior to operation of the vehicle along a road of a road network, data contained in a first version of the database to identify locations along roads of the road network where the determined hazardous condition might exist, wherein the hazardous condition comprises a combination of the first condition and the second condition which are satisfied together at a same location along a road of the road network, wherein the step of evaluating further comprises:

evaluating a first type of data that represents geographic features of an identified location along the road of the road network to determine if the first condition is satisfied thereby, and upon determining that the first type of data that represent geographic features satisfies the first condition, evaluating a second type of data that represents geographic features which are geographically located around the identified location along the road of the road network at which the first condition is satisfied to determine if the second condition is satisfied at or around the identified location at which the first condition was satisfied; and upon determining satisfaction of the second condition at or around the identified location at which the first condition was satisfied, adding precautionary action data to the first version of the database in association with the identified location to form the augmented version of database to indicate that a precautionary action is to be taken by the vehicle system when the vehicle is approaching the identified location along the road of the road network; and wherein, upon determining that data representations of a part of the road of the road network stored in the augmented database includes precautionary action data, providing a precautionary action to the vehicle operator upon approach to the location associated therewith.

7. The method of claim 6 wherein the first condition comprises a first feature existing at the location or an attribute thereof exceeding a threshold and the second condition comprising a second feature existing at the location or an attribute thereof exceeding a threshold.

8. The method of claim 6 wherein the providing of the precautionary action further comprises notifying the operator of the vehicle to modify the operation thereof.

* * * * *